United States Patent

Newns et al.

[11] 3,999,835
[45] Dec. 28, 1976

[54] DIELECTRIC OPTICAL WAVEGUIDES

[75] Inventors: George Reginald Newns, Hintlesham; Keith John Beales, Henley, both of England

[73] Assignee: The Post Office, London, England

[22] Filed: Nov. 14, 1974

[21] Appl. No.: 523,739

[30] Foreign Application Priority Data

June 27, 1973 United Kingdom ............ 30649/73
Nov. 29, 1973 United Kingdom ............ 55388/73

[52] U.S. Cl. .......................... 350/96 WG; 350/96 R
[51] Int. Cl.² ............................................ G02B 5/14
[58] Field of Search ............................. 350/96 WG

[56] References Cited
UNITED STATES PATENTS

| 3,558,213 | 1/1971 | Marcatili ..................... 350/96 WG |
| 3,806,223 | 4/1974 | Keck et al. .................. 350/96 WG |

OTHER PUBLICATIONS

Rand et al, "Applied Optics", Nov. 1972, pp. 2482–2488.

*Primary Examiner*—R. V. Rolinec
*Assistant Examiner*—Darwin R. Hostetter
*Attorney, Agent, or Firm*—Kemon, Palmer & Estabrook

[57] ABSTRACT

Dielectric optical waveguides can be made having a core of vitreous silica doped with nitrogen in the form of silicon nitride, and a cladding of pure vitreous silica. Silicon nitride may be present in the core material in quantities varying between .1% to 10% by weight. The silicon nitride doped silica glass can be formed in a boule by passing a mixture of gaseous compounds containing silicon and nitrogen through a induction coupled plasma discharge. The outside of the doped silica boule may be oxidized to reduce the nitrogen content.

3 Claims, 4 Drawing Figures

DIELECTRIC OPTICAL WAVEGUIDES

The invention relates to dielectric optical waveguides and methods of making dielectric optical waveguides.

The term "optical" as herein used is to be understood as including within its scope the regions of the electromagnetic spectrum more usually designated as the infra-red, visible, and ultra-violet.

In order to make dielectric optical waveguides suitable for telecommunications purposes, it is necessary to have glasses with extremely low absorption coefficients and refractive indices which differ by small amounts. It is possible to prepare vitreous silica so that it has an extremely small attenuation coefficient. However in order to make a dielectric optical waveguide it is necessary to have a second glass with a refractive index close to that of vitreous silica but differing from it by a small amount. Such a glass may be prepared by adding a suitable dopant to vitreous silica. Doped vitreous silicas of this type are now fairly well known. However previous doped vitreous silicas have been prepared by introducing a cation into the vitreous silica such as titanium, alumnium, or zirconium, see United Kingdom specification No. 1,368,093. However it has also proved possible to dope vitreous silica with an anion.

The present invention is concerned with a vitreous silica doped with an anion, in particular nitrogen, and a method of making dielectric optical waveguides incorporating such a doped vitreous silica. When vitreous silica is doped with nitrogen its refractive index is increased. So under these circumstances the doped vitreous silica will act as the core of a dielectric optical waveguide in which it is used.

According to a first aspect of the present invention there is provided a dielectric optical waveguide having a core region and a cladding region, said core region comprising glass containing between 90% to 99.9% silica by weight and 0.1% to 10% by weight of $Si_x R_y$ where R is an anion other than oxygen.

Preferably R is nitrogen.

According to a second aspect of the present invention there is provided a method of making a dielectric optical waveguide comprising:

a. forming a boule of silica doped with $Si_x R_y$ by passing a mixture containing a silicon compound and a compound of R, both in gaseous form, through an induction coupled plasma torch.
b. heating said boule to a temperature in excess of 800° C in an oxygen containing atmosphere and
c. drawing said boule into a dielectric optical waveguide.

According to a third aspect of the present invention there is provided a method of making a dielectric optical waveguide comprising:

a. forming a boule of silicon doped with $Si_x R_y$, by passing a mixture containing a silicon compound and a substance containing R, both in gaseous form through an induction coupled plasma torch
b. drawing said boule into a fibre having the dimensions of a dielectric optical waveguide, and
c. heating said fibre to a temperature in excess of 800° C in an oxygen containing atmosphere.

An embodiment of the invention will now be described by way of example with reference to the accompanying drawings in which.

A glass can be made containing a mixture of $SiO_2$ and $Si_3 N_4$. In this glass nitrogen is the only principal constituent other than silicon or oxygen. Nitrogen is anionic in this particular glass. This contrasts with most glasses in which the principal constituents other than silica and oxygen are in the form of oxides i.e. the principal constituents other than silicon and oxygen are cationic.

The refractive index of a glass containing a mixture of silica and silicon nitride is higher than the refractive index of pure silica. This means that a silica-silicon nitride glass is suitable for use in the core of a dielectric optical waveguide having a pure silica cladding.

Two well known types of dielectric optical waveguide are the stepped index dielectric optical waveguide and the graded index dielectric optical waveguide. In the stepped index dielectric optical waveguide the core and cladding are discrete well defined entities in the sense that the refractive index changes suddenly between the core and the cladding. In the graded index dielectric optical waveguide there is a continuous gradation in refractive index between core and cladding so that there is no definite boundary between the two regions. However it is still possible to think of the central region as the core region and an outer region as the cladding region.

The present specification discloses two methods of making dielectric optical waveguides having cores containing a silica-silicon nitride glass. These will be described in turn.

Figure 4:
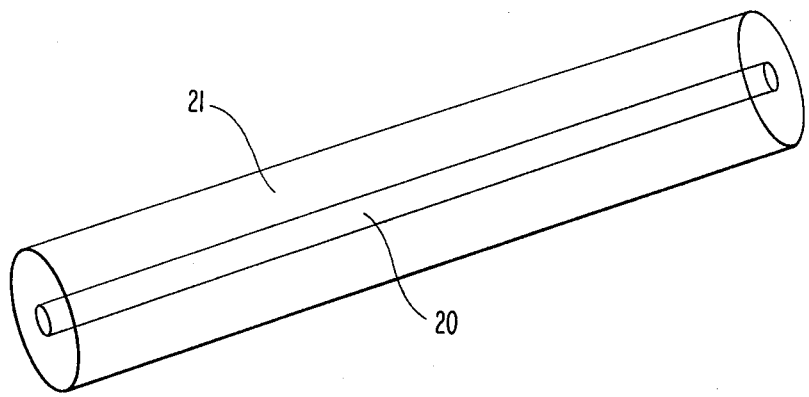
FIG. 4 shows an embodiment of the invention.

FIG. 4 shows a section of a stepped index dielectric optical waveguide of the type with which the present invention is concerned. The dielectric optical waveguide consists of a core 20 of a glass of a higher refractive index, surrounded by a cladding 21 of a glass of a lower refractive index. A graded index dielectric optical waveguide has a similar general appearance, with the exception that there is no clear boundary between the core 20 and the cladding 21.

Figure 1:
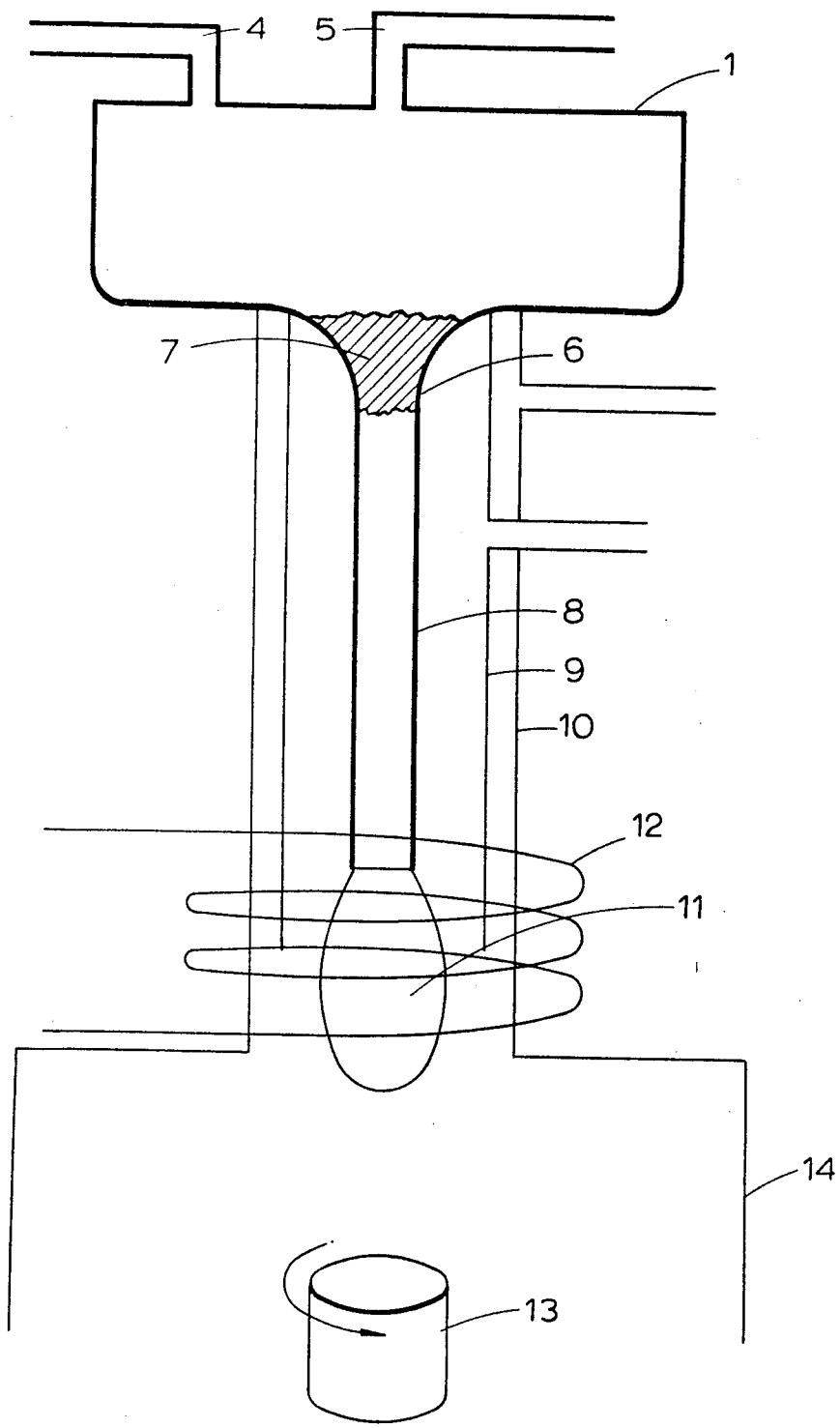
FIG. 1 shows in diagrammatic form an apparatus for making a doped silica boule.

Referring to FIG. 1, a mixture of argon and silicon tetrachloride is fed to a mixing chamber 1 via pipe 5. Nitrogen is also fed to mixing chamber 1 via pipe 4. In mixing chamber 1 the gas streams are combined and passed through silica wool 7 which ensures adequate mixing. The gas mixture then passes down pipe 8 to the induction coupled plasma discharge 11. Two pipes 9 and 10 are arranged concentrically around pipe 8. Initially, i.e. before the plasma discharge 11 is running smoothly, pipe 9 carries pure argon and pipe 10 carries oxygen. The exterior of pipe 10 is cooled by a water jacket. When the plasma discharge 11 is running smoothly the flow of argon through pipe 9 is replaced by a mixture of oxygen and argon comprising from 0% to 80% oxygen. The plasma torch is powered by radio frequency coupled to the plasma by coil 12. The reactants attain a temperature in excess of 5000 degrees K in the plasma.

The nitrogen in the plasma may be present in the form of active nitrogen i.e. a mixture of ionised nitrogen, isolated nitrogen atoms, and a certain amount of molecular nitrogen. In this form the nitrogen is extremely reactive and reacts with the silicon dioxide present in the plasma to form silicon nitride. The silicon tetrachloride is oxidised in the plasma to form silicon dioxide. It is of course difficult to say exactly what molecular species are or are not present in the plasma. However in the final result a mixture of silicon dioxide and silicon nitride are formed. This mixture is condensed onto a rotating target 13 to form a boule of vitreous silica doped with nitrogen.

Although the method described above employs nitrogen, any of the nitrogen containing compounds disclosed hereinafter with reference to the second method of manufacture may be employed.

In order to form a dielectric optical waveguide from the boule of doped vitreous silica, the doped vitreous silica is placed inside a tube of pure vitreous silica and drawn in a conventional manner.

Alternatively pure vitreous silica may be formed by vapour deposition on the outside of the doped vitreous silica boule and the resultant preform then drawn. Alternatively the exterior of the nitrogen doped vitreous silica boule may be oxidised by heating the rod to a temperature of 800° C or above for an extended period. This heat treatment may be carried out before the boule is drawn, during the drawing operation, or the drawn fibre may be heat treated.

Figure 2:
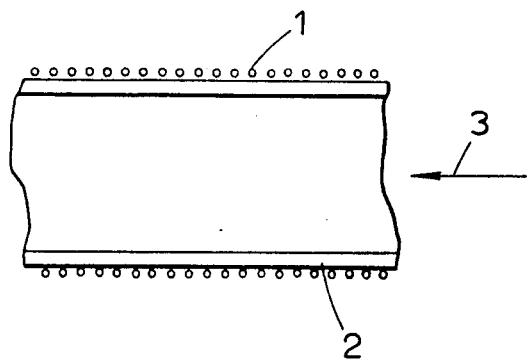
FIG. 2 shows in diagrammatic form an apparatus for making a dielectric optical waveguide preform.

Referring now to FIG. 2 of the drawings, a second method for the production of a dielectric optical waveguide is now described. A silica tube 2 is heated by means of heating coils 1, and gas is passed down the length of the tube as indicated at 3. The gas flow contains silicon compounds and nitrogen compounds. In the heated section of the silica tube 2 the silicon and nitrogen compounds decompose and react to form a silica-silicon nitride glass which is deposited on the walls of the silica tube 2. Typically the silica tube is maintained at a temperature of 1000°–1600° C. In order to improve the adhesion between the silica tube and the silica-silicon nitride glass, a layer of pure silica may be deposited on the tube first, by passing a volatile silicon compound through the tube such as silicon chloride. If a pure silica layer is formed on the inside of the heated tube the tube may be made of any refractory material which is thermally compatible with silica and silica-silicon nitride glass, for example the tube could be made of a doped silica. After the silica and silica-silicon nitride glass layers have been formed on the interior of the tube the tube is mounted on a glass-blowing lathe and the tube is heated and collapsed to form a glass fibre preform. If water is formed in the reaction occurring when the silica or silica-silicon nitride glass is formed, it may be necessary to hold the glass tube under vacuum and heat it for a considerable time to out-gas as much water vapour from the interior layers of the tube as possible. The preform is then drawn out into dielectric optical waveguide in the usual manner using a standard fibre drawing apparatus. Typically the heated tube could be of diameter 0.5 centimeters with a thickness of 0.1 centimeters, which after collapsing has a diameter of 0.22 centimeters, if a tube of diameter 0.5 centimeters and thickness 2 millimeters is used the preform has a diameter of 0.32 centimeters after collapse.

Figure 3:
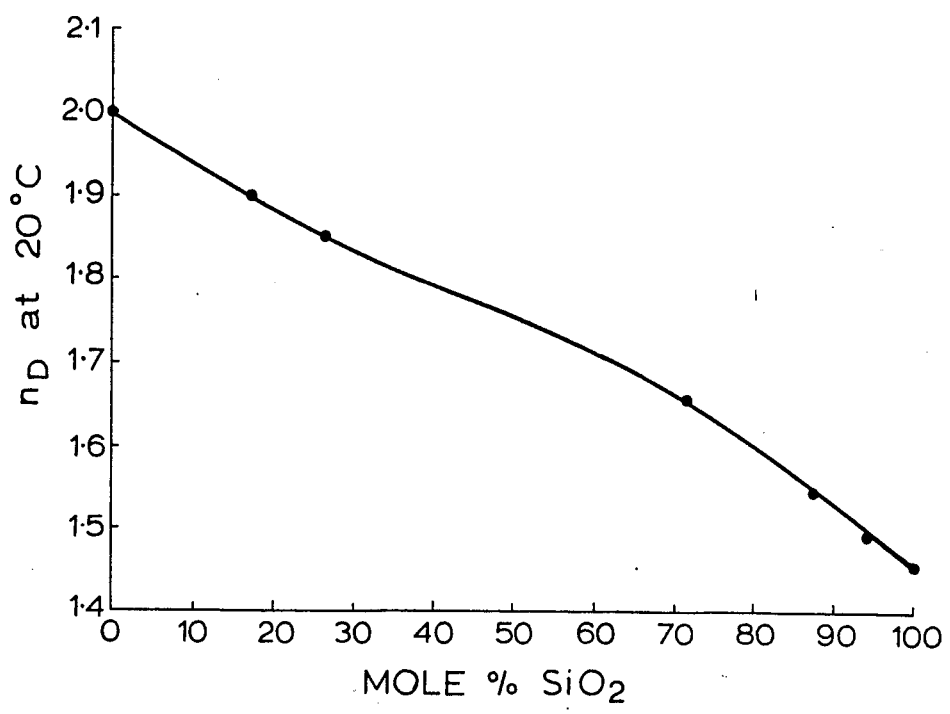
FIG. 3 shows a graph of refractive index vs. Mol % $SiO_2$ for the $Si_3N_4$— $SiO_2$ system.

A number of different gas compositions can be used to form the silica-silicon nitride glass, some of these are listed below:

1. $SiH_4+NO+N_2+NH_3$
2. $SiCl_4+NO+N_2+NH_3$
3. $Si_2OCl_6+NO+N_2+NH_3$
4. $SiH_4+N_2O+NH_3+N_2$
5. $SiCl_4+N_2O+NH_3+N_2$
6. $Si_2OCl_6+N_2O+NH_3+N_2$
7. $SiH_4+CO_2+NH_3+N_2$
8. $SiCl_4+CO_2+NH_3+N_2$
9. $Si_2OCl_6+CO_2+NH_3+N_2$
10. $Si(NR_1R_2)_x(OR_3)_{4-x}+NH_3+N_2$ where $R_1$, $R_2$ and $R_3$ are organic radicals When the dielectric optical waveguide is formed by drawing it has a core consisting of a silica-silicon nitride glass and a cladding of pure silica. By varying the percentage of silicon nitride in the glass, the refractive index of the core can be adjusted to have the right value. Silica-silicon nitride glasses can be made to have any refractive index in the range 1.5 to 2 by varying the percentage of silica present from nearly 100% to 0. FIG. 3 shows the refractive index variation for the vapour deposited films. After the silica layer has been formed on the inside of the tube 2, the composition of the interior layer of glass can be continuously varied by continuously varying the quantity of nitrogen containing compound in the gas flow. This results in the drawn fibre having no sharp boundary between the core and the cladding, but a continuously varying refractive index from the cladding region into the core.

What we claim is:

1. A telecommunication dielectric optical waveguide in the form of a drawn fiber having a core region and a cladding region, said core region comprising a glass containing between 90% and 99.9% silica by weight and 0.1% to 10% by weight of $Si_3N_4$.

2. A dielectric optical waveguide as claimed in claim 1 wherein said dielectric optical waveguide is a stepped index dielectric optical waveguide.

3. A dielectric optical waveguide as claimed in claim 1 wherein said dielectric optical waveguide is a graded index dielectric optical waveguide.

* * * * *